United States Patent
Yazvin et al.

(10) Patent No.: US 11,793,352 B2
(45) Date of Patent: Oct. 24, 2023

(54) TOASTER WITH ADJUSTABLE CONVEYOR

(71) Applicant: Marmon Foodservice Technologies, Inc., Osseo, MN (US)

(72) Inventors: Aleksandr Yazvin, Glenview, IL (US); Alexander Malevanets, Vernon Hills, IL (US); Loren Veltrop, Chicago, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 741 days.

(21) Appl. No.: 16/856,591

(22) Filed: Apr. 23, 2020

(65) Prior Publication Data

US 2020/0245808 A1 Aug. 6, 2020

Related U.S. Application Data

(63) Continuation of application No. 15/859,860, filed on Jan. 2, 2018, now Pat. No. 10,660,466.

(Continued)

(51) Int. Cl.
*A47J 37/08* (2006.01)
*A47J 36/00* (2006.01)
(Continued)

(52) U.S. Cl.
CPC .............. *A47J 36/00* (2013.01); *A47J 27/14* (2013.01); *A47J 36/32* (2013.01); *A47J 37/08* (2013.01);
(Continued)

(58) Field of Classification Search
CPC .... A47J 37/044; A47J 37/0611; A47J 37/067; A47J 37/0704; A47J 37/08; A47J 37/0814; A47J 37/085; A47J 37/0857; A47J 37/0864; A47J 37/0871; A47J 36/00; A47J 36/32; A37J 27/14
(Continued)

(56) References Cited

U.S. PATENT DOCUMENTS 4,261,257 A * 4/1981 Henderson ............ A47J 37/044
99/349
4,286,509 A 9/1981 Miller et al.
(Continued)

FOREIGN PATENT DOCUMENTS

CN 205321039 U 6/2016
WO 9943244 A1 9/1999

OTHER PUBLICATIONS

European Search Report for corresponding European Application No. 18166648.8 dated Jul. 23, 2018.
(Continued)

*Primary Examiner* — Hung D Nguyen
(74) *Attorney, Agent, or Firm* — Andrus Intellectual Property Law, LLP

(57) ABSTRACT

A conveyor toaster includes a conveyor assembly with a bracket and a conveyor belt. The conveyor belt rotates about first and second gears. A drive motor operates to move the conveyor belt about the first and second gears. A platen is configured to be heated and is positioned relative to the conveyor belt. A mounting bracket is connected to the bracket of the conveyor assembly. Movement of the mounting bracket changes the position of the conveyor assembly relative to the platen.

20 Claims, 9 Drawing Sheets

Related U.S. Application Data

(60) Provisional application No. 62/484,214, filed on Apr. 11, 2017.

(51) Int. Cl.
*A47J 27/14* (2006.01)
*A47J 36/32* (2006.01)

(52) U.S. Cl.
CPC ......... *A47J 37/085* (2013.01); *A47J 37/0814* (2013.01); *A47J 37/0857* (2013.01)

(58) Field of Classification Search
USPC ......... 99/385, 386, 387, 390, 391, 393, 397, 99/443 R, 443 C, 448
See application file for complete search history.

(56) References Cited

U.S. PATENT DOCUMENTS

| | | |
|---|---|---|
| 4,530,276 A | 7/1985 | Miller |
| 5,132,520 A * | 7/1992 | Blanton ............... A47F 3/001 219/400 |
| 5,473,975 A | 12/1995 | Bruno et al. |
| 5,673,610 A | 10/1997 | Stuck |
| 5,960,704 A | 10/1999 | March et al. |
| 5,983,785 A | 11/1999 | Schreiner et al. |
| 6,019,030 A | 2/2000 | Kettman |
| 6,177,654 B1 | 1/2001 | Schackmuth |
| 6,192,789 B1 | 2/2001 | Agcaoili et al. |
| 6,223,650 B1 | 5/2001 | Stuck |
| 6,281,478 B2 | 8/2001 | Chandler et al. |
| 6,311,610 B1 | 11/2001 | Kettman |
| 6,595,117 B1 | 7/2003 | Jones et al. |
| 7,067,769 B2 | 6/2006 | Sands et al. |
| 7,217,906 B2 | 5/2007 | Veltrop et al. |
| 7,297,903 B1 | 11/2007 | March et al. |
| 7,763,830 B2 | 7/2010 | Sands et al. |
| 8,522,673 B2 | 9/2013 | Chung et al. |
| 8,789,459 B2 | 7/2014 | Chung et al. |
| 9,049,875 B2 | 6/2015 | Ewald et al. |
| 9,702,858 B1 * | 7/2017 | Minvielle ............. A47J 36/321 |
| 2003/0056658 A1 | 3/2003 | Jones et al. |
| 2010/0275789 A1 | 11/2010 | Lee et al. |
| 2012/0121782 A1 | 5/2012 | Veltrop et al. |
| 2013/0306616 A1 * | 11/2013 | Wildebush .......... A47J 37/0857 219/413 |
| 2016/0185530 A1 | 6/2016 | Malkowski et al. |
| 2016/0348918 A1 * | 12/2016 | Bhogal ................... F24C 15/04 |

OTHER PUBLICATIONS

Office Action for Chinese Patent Application No. 201810315557.2, dated Mar. 2, 2021.

* cited by examiner

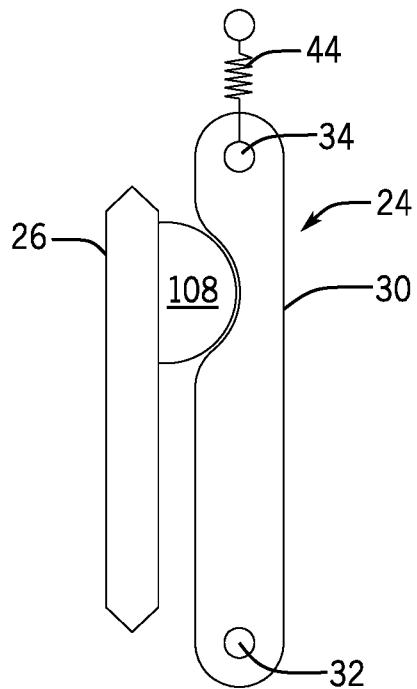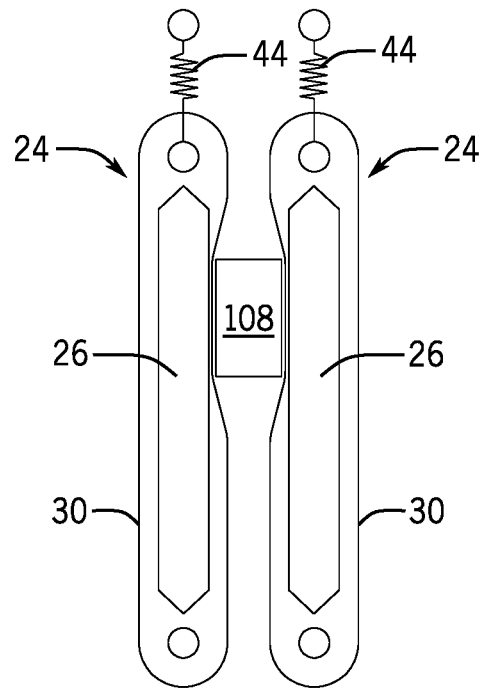
FIG. 8          FIG. 9
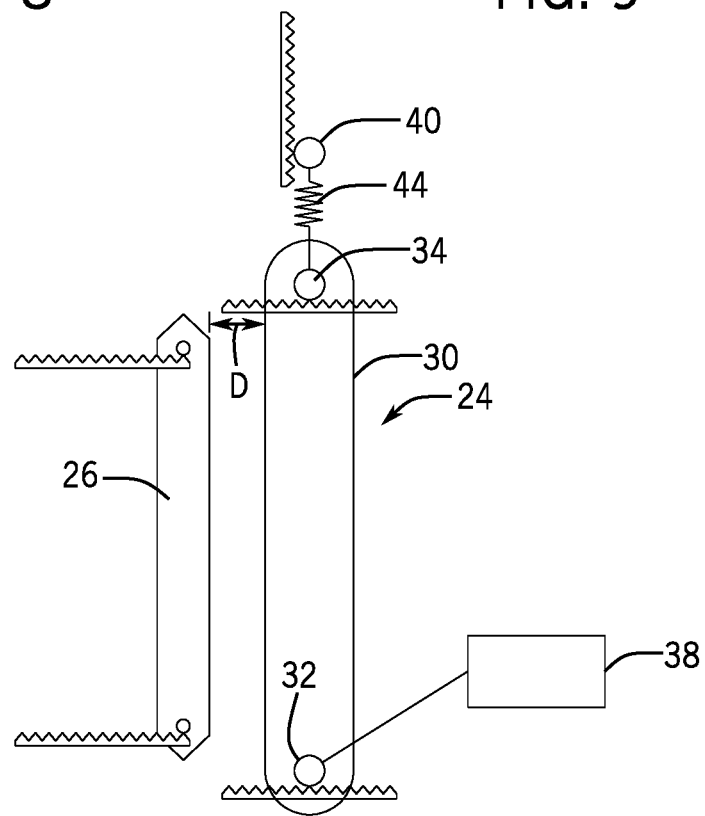
FIG. 10

TOASTER WITH ADJUSTABLE CONVEYOR

CROSS-REFERENCE TO RELATED APPLICATION

The present application is a continuation application of U.S. application Ser. No. 15/859,860, filed on Jan. 2, 2018 which claims priority of U.S. Provisional Patent Application No. 62/484,214, filed on Apr. 11, 2017, the contents of which are hereby incorporated herein by reference in their entireties.

BACKGROUND

The present disclosure is related to the field of toasters. More specifically, the present disclosure is related to toasters which are adjustable to accommodate toasting of a variety of food products.

A conveyor toaster is a well-known cooking device that uses a vertical or near-vertical heating platen and a slowly rotating conveyor, which urges a food product against the platen while it simultaneously drags a food product downwardly and across the platen's hot surface. By virtue of its design, a conveyor toaster is able to process food products continuously as opposed to the toasters commonly used by consumers, which process food products in a batch mode.

Conveyor toasters are ill-suited for consumer use because of their size, manufacturing cost, power requirements, and the time required to pre-heat the platen to operating temperature. Conveyor toasters are preferred by restaurants and food preparation services however that require high-volume through-put and consistent heating/toasting of the food products.

A well-known problem with prior art conveyor toasters is that heavy-gauge wire conveyors that urge a food product against the platen and which moves the food product across the platen tend to leave marks in soft food products like breads and bagels. Another problem with prior art conveyor toasters is the inability to process food products of varying thicknesses due to the fact that the spacing or separation distance between the actual conveyor and the heated platen is fixed. Food products that are too thin will thus fall through a prior art conveyor toaster. Food products that are too thick can jam the conveyor in place. Yet another problem with prior art conveyor toasters is that they are difficult to clean because the conveyors are fixably attached to the toaster bodies.

Solutions for adjustable conveyor toasters have been proposed, for example as found in "Toaster With Removable and Adjustable Conveyors", U.S. Patent Application Publication No. 2010/0275789, which is herein incorporated by reference in its entirety. U.S. Patent Application Publication No. 2012/0121782, entitled "Conveyor Toaster With Self-Aligning Belts," which is herein incorporated by reference in its entirety, uses a rib attached to the inside surface of a continuously rotating belt to assist belt alignment and also provides a manual belt-tensioning lever. However, the mechanical solutions disclosed in those applications provide for a limited range of adjustment and a toaster with a greater flexibility of arrangements and adjustments could provide greater flexibility in the food products and toasting operations performed within a single toaster unit.

BRIEF DISCLOSURE

An exemplary embodiment of a conveyor toaster includes a conveyor assembly. The conveyor assembly includes a bracket. A first gear is rotatably connected to the bracket. A second gear is rotatably connected to the bracket. A conveyor belt is in engagement with the first gear and the second gear. A drive motor is operably connected to the first gear. The drive motor operates the drive gear to move the conveyor belt about the first and second gears. A platen is configured to be heated and is positioned relative to the conveyor belt. A mounting bracket is connected to the bracket of the conveyor assembly. Movement of the mounting bracket changes the position of the conveyor assembly relative to the platen.

In a further exemplary embodiment, the conveyor toaster includes a tension spring connected between the bracket and the second gear. The tension spring applies a tensioning force on the second gear in a direction away from the first gear to place a variable tension on the conveyor belt. In another exemplary embodiment, the toaster includes an adjustment assembly connected to the mounting bracket. The adjustment assembly includes a carriage connected to the mounting bracket. A rack with a plurality of teeth is connected to the carriage. A pinion with a plurality of teeth is enmeshed with the plurality of teeth of the rack and rotation of the pinion translates the conveyor assembly relative to the platen.

An additional exemplary embodiment of a conveyor toaster includes a conveyor assembly. The conveyor assembly includes a conveyor belt that is movable about a support bracket. A drive motor is operably connected to the conveyor assembly to move the conveyor belt about the support bracket. A platen is configured to be heated and is positioned relative to the conveyor belt. A controller is operably connected to the drive motor and to the platen. The controller controls a speed of the conveyor belt about the support bracket. The controller controls a temperature of the platen. An adjustment assembly is connected to the conveyor assembly. The adjustment assembly includes at least one mounting bracket connected to the support bracket of the conveyor assembly to move the conveyor assembly relative to the platen.

BRIEF DESCRIPTION OF THE DRAWINGS

FIG. 8 is a schematic view of a conveyer and platen toaster.

FIG. 9 is a schematic view of a dual conveyer toaster.

FIG. 10 is a schematic view of adjustable elements of an embodiment of a toaster.

DETAILED DISCLOSURE

Figure 1:
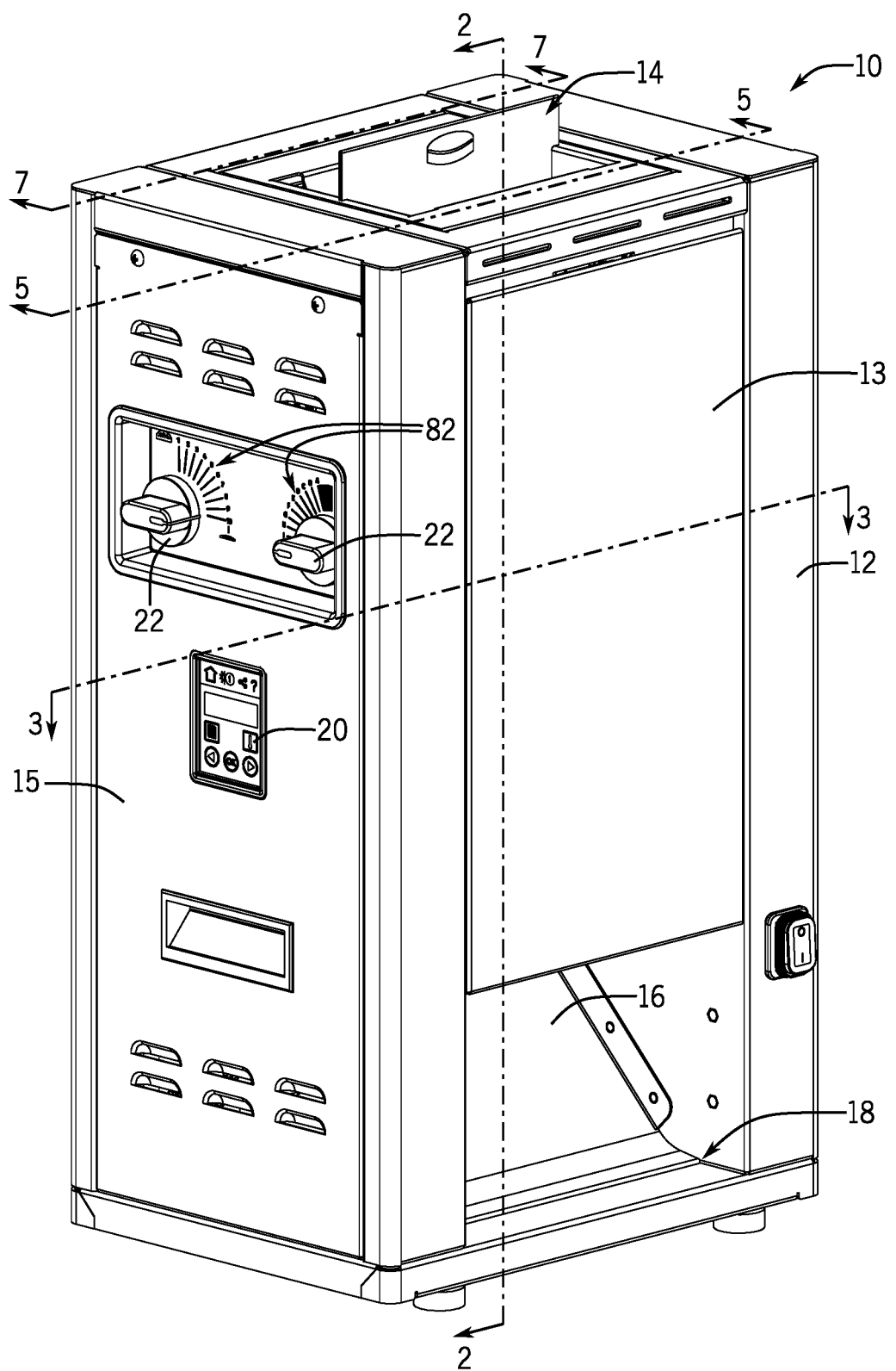
FIG. 1 is a perspective view of an exemplary embodiment of a toaster.

As provided herein exemplary embodiments of devices and methods for heating food products are constructed with a plurality of independent and adjustable systems whereby a single apparatus can be selectively operated to toast a wide variety of food products including, but not limited to buns, rolls, croissants, bagels, muffins, flatbread, pitas, cakes, pastries, and so forth. In still further exemplary embodiments prepared food products such as sandwiches, burritos, or the like may also be toasted according to the apparatus and method as disclosed herein.

The terms "heat" and "heating" mean, to "make warm or hot". The term "heating food products" means to make food products warm or hot. The terms, heat, heating, and heating food products include heating a food product to a temperature at which the food product is toasted. As used herein, toast, toasted, and toasting all refer to heating a food product to make it crisp, hot, and/or brown by heat or heating.

It is well known that toasted bread products have a distinctly different flavor than do the same products prior to toasting. Toasting also changes a bread product's color and its texture. Toasting and toasted bread products also give off a pleasing aroma. Toasting and its effects are the result of a Maillard reaction.

A conveyor toaster typically arranges at least one conveyor relative to at least one heated platen and the conveyor is configured to drag a food product over the side of the heated platen. The surface of the food product in contact with the side of the platen is thus heated.

Consistent continuous toasting of multiple food products requires close coordination between the conveyor speed, conveyor tension, and a minimum distance between the conveyor and the platen. Thus, the tendency in conveyor toasting systems is to integrate all of these systems together which provides tolerance control but limits system flexibility or adjustability. Even in systems that have adjustable components, such systems are still not able to accommodate a wide variety of food products. Thus, conveyor toasters tend to be constructed to a specification to toast a particular food product or narrow range of similar food products.

One significant consideration in current conveyor toaster products is control of the gap between the conveyor belt and the platen. Conveyor toasters use a cam to force the conveyor towards the platen to define a minimum conveyor-platen distance. While this distance serves to force the food product into contact with the platen and to engage the food product with the conveyor to drag the food product along the platen, this minimum distance, if too large will result in the food product falling through the toaster without the necessary engagement with the platen while if the minimum distance is too small, the food product will be crushed. While some food products are resilient and return to shape, other food products are more delicate and may be damaged by such crushing. The position of the cam also can be used to define the tension on the belt. As the belt is forced towards the platen, more tension is placed on the belt. Therefore, belt tension and conveyor-platen distance are related. This adjustment position is often selected to balance between crushing the bread product, and encouraging sufficient engagement between the bread and the platen to achieve the desired toasting effect.

The devices and methods as disclosed herein address the above-noted problems as well as others by providing a conveyor toaster in which a plurality of the mechanical systems are independently adjustable and operable such that a single conveyor toaster can accommodate toasting of a wide variety of food products.

Figure 3:
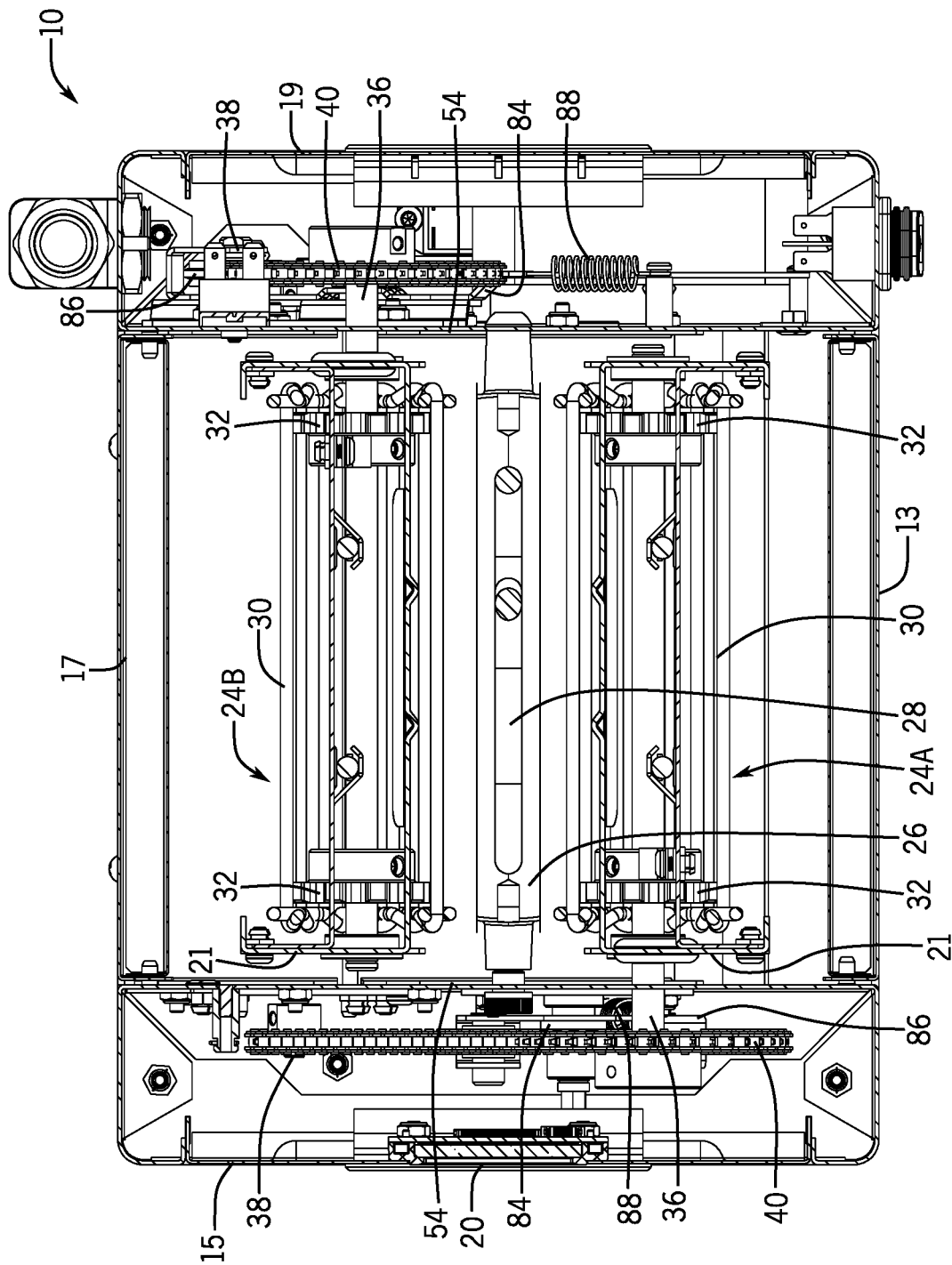
FIG. 3 is a sectional view taken along line 3-3 of FIG. 1.

FIG. 1 depicts an exemplary embodiment of a toaster 10. The toaster 10 is defined by a cabinet 12 and includes a feed opening 14 at the top. The cabinet 12 is constructed with a front panel 13 and a control side panel 15. As shown in FIG. 3, the cabinet 12 also includes a rear panel 17 and an off side panel 19. The feed opening 14 is configured to receive pieces of food product to be toasted. In exemplary configurations, the feed opening 14 may be a single opening for use with a single toasting path while in other embodiments the feed opening 14 may be bifurcated such as to provide two different toasting paths which may be configured and operated to simultaneously provide two different toasting operations, for example, the toasting the heel and the crown of the bun and/or a middle club portion of the bun.

The toasted food products exit the toaster 10 by way of a discharge slide 16 which directs the toasted food products to the discharge port 18 at the bottom of the toaster 10, exemplarily defined below the front panel 13. However, it will be recognized that the discharge port 18 may be oriented to dispense toasted food products through a different side of the toaster 10, or even out of the bottom.

The toaster 10 further includes one or more input devices, which may exemplarily be in the form of a touch sensitive display 20 and/or dials 22. It will be recognized that various different input devices may be used with the embodiments described herein, including touch sensitive displays, dials, buttons, switches, or other input devices as will be recognized by a person of ordinary skill in the art.

Figure 2:
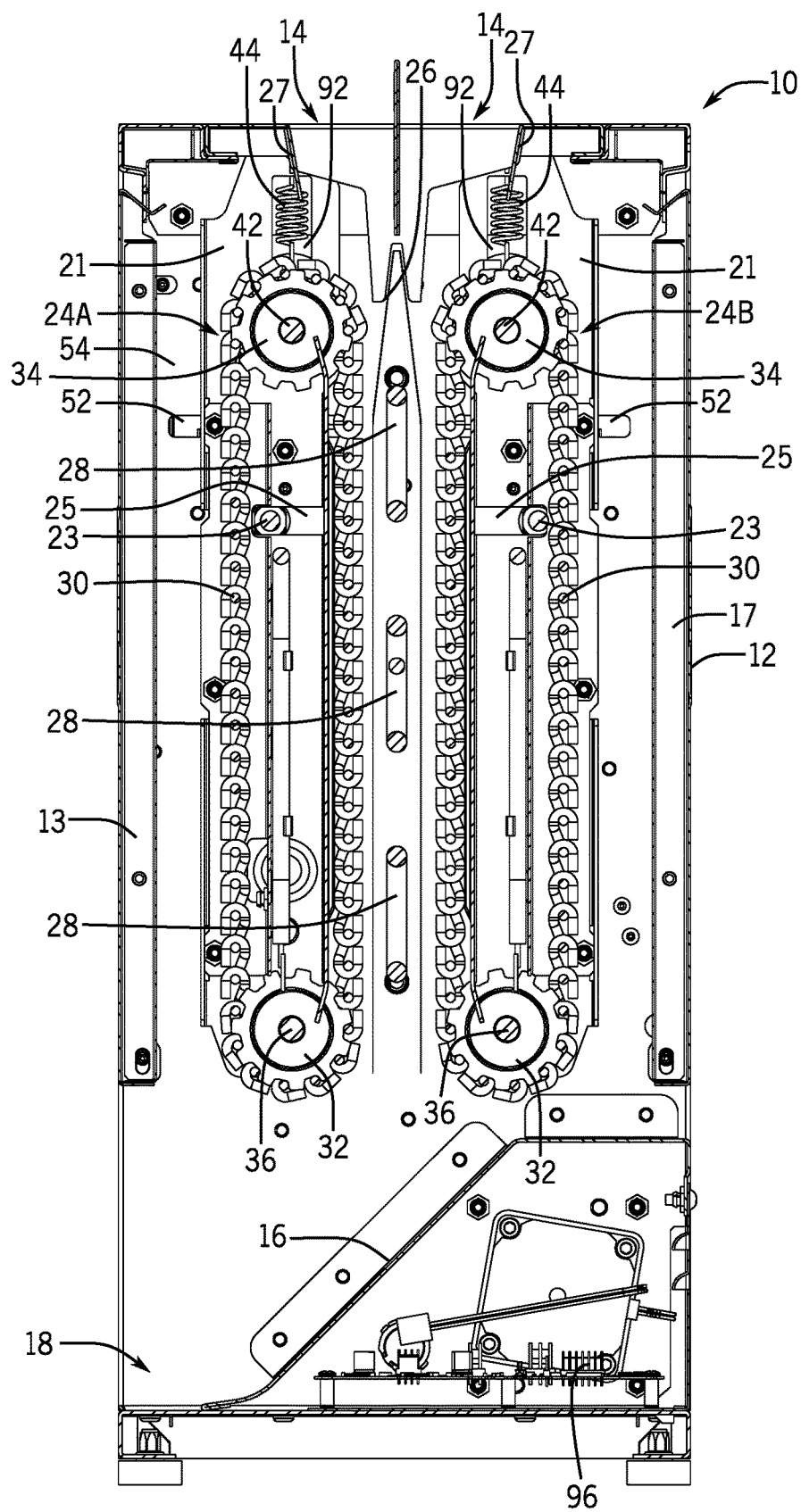
FIG. 2 is a sectional view taken along line 2-2 of FIG. 1.

FIG. 2 is a sectional view of the toaster 10 taken along line 2-2 of FIG. 1. In this view, two conveyor assemblies 24a and 24b are depicted relative to a platen 26. The platen 26 includes heating coils 28 which may exemplarily be electric heating elements and which are controlled to heat the platen 26 to a set or predetermined temperature.

The conveyor assemblies 24a, 24b each include a bracket 21. The bracket 21, as will be detailed further herein, supports a conveyor belt 30. The bracket 21 is movable relative to the platen 26 in order to adjust a distance between the conveyor belt 30 and the platen 26. Adjustment shafts 23 which are connected to the dials 22, depicted in FIG. 1, extend through the toaster 10 and within slots 25 in the bracket 21. In this manner the bracket 21 is movable relative to both the shaft 23 and the platen 26 to adjust the spacing between the conveyor belt 30 and the platen. Conveyor belts 30 may take various forms as known in the field of toasters, including, but not limited to Teflon belts, wire belts, wire and silicon belts, wire and metal plate belts, and solid metal plate belts. The aforementioned examples of conveyor belts are exemplary listed in order from most flexible to least flexible. Conveyor belt flexibility, as will be described with respect to embodiments herein can have an impact regarding how the belt is tension and the ability of the belt to deform relative to a food product being toasted.

The conveyor belts 30 respectively move around drive gears 32 and slave gears 34. The drive gears 32 are rotatably connected to the bracket 21 and the slave gears 34 are movably connected to the bracket 21 as described in further detail herein. The drive gears 32 are respectively secured to drive shafts 36. As exemplarily depicted in FIG. 3, which is a cross-sectional view of the toaster 10 taken along like 3-3 of FIG. 1, the respective drive shafts 36 are respectively driven by drive motors 38. In a non-limiting embodiment, a drive chain 40 may motively connect the drive motor 38 to the drive shaft 36. In an exemplary embodiment, the drive motors 38 may be electrical stepper motors. As previously noted in exemplary embodiments a separate drive motor 38 is provided for each conveyor assembly 24.

The rotation of the drive gears 32 causes the conveyor belt 30 to move and the conveyor belt 30 at an opposite end rotates about the slave gear 34 which rotates about a slave shaft 42. Tensioning springs 44 are connected between respective spring mounts 27 on the brackets 21 and the ends of the slave shafts 42 and/or the slave gears 34. It will be recognized a tensioning spring 44 may be connected to a connector, for example a plate, that is in turn connected to the slave shaft 42 and/or the slave gear 34. The tensioning springs 44 provide a bias force and tension on the conveyor belt 30 as it rotates about the slave gear 34 and drive gear 32. It will be recognized in the present embodiment and in further embodiments disclosed herein that a compression force against a piece of food being toasted by the toaster 10 may exemplarily be defined by a conveyor belt placed in tension by the tensioning springs and a conveyor belt-platen gap. Through embodiments disclosed herein, this compression force can be selectively adjusted to toast a variety of types of food with different toasting qualities and characteristics. Embodiments as disclosed herein exemplarily provide for parallel alignment and movement of the conveyor belt relative to the platen to provide an even conveyor belt-platen gap and even compression over the toasting process.

Figure 4:
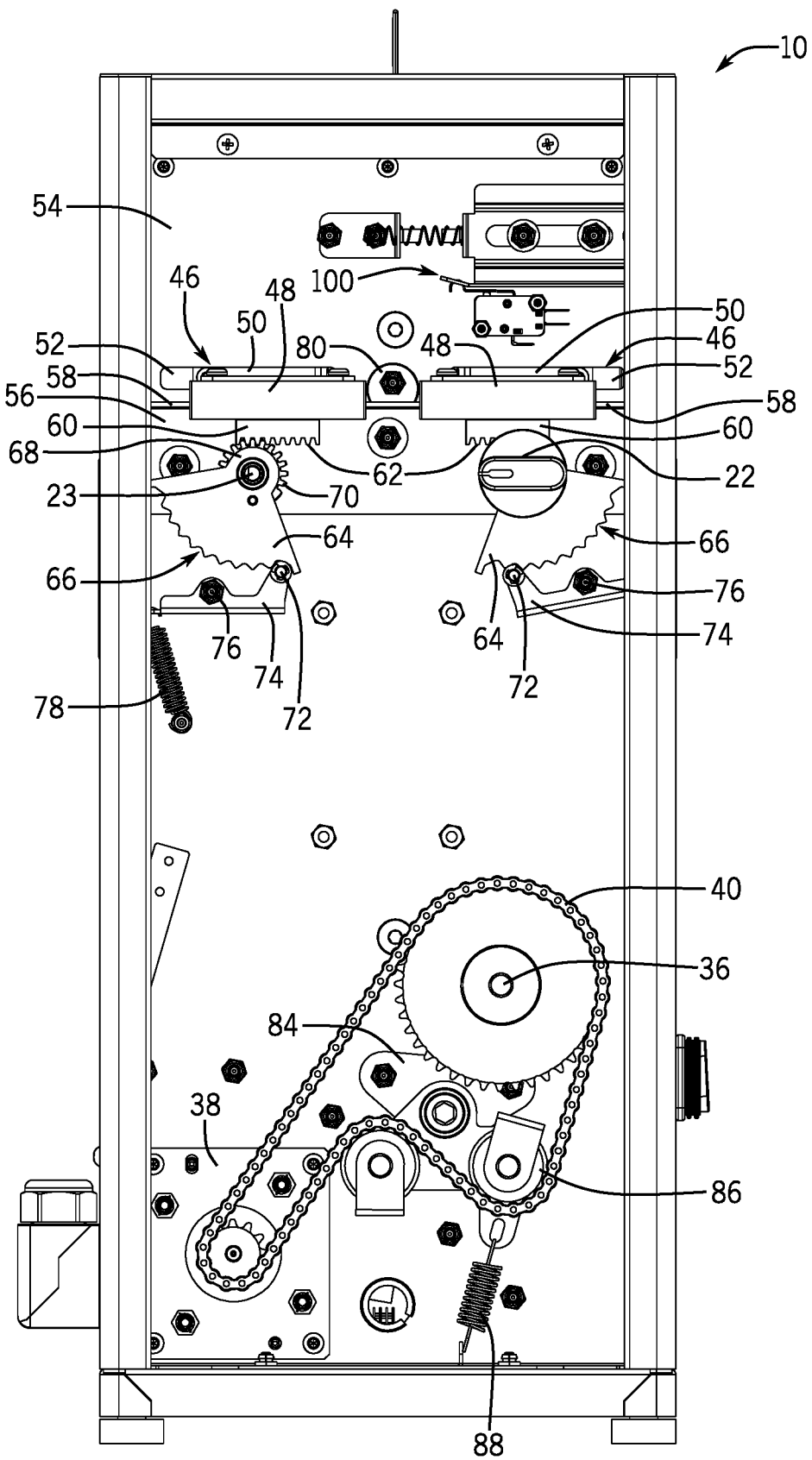
FIG. 4 is a side view of an exemplary embodiment of a toaster.

FIG. 4 is a side view of an exemplary embodiment of the toaster 10 with the control side panel 15 removed for clarity. FIG. 4 depicts adjustment assemblies 46 for the conveyor assemblies 24. As previously noted with respect to FIGS. 1 and 2, the adjustment assemblies 46 each include a dial 22 secured to a shaft 23. In FIG. 4, one dial 22 is removed to provide better visualization of the components there behind, including the end of the shaft 23.

The adjustment assembly 46 includes a carriage 48. The carriage 48 includes a bracket mount 50 which is secured through a slot 52 in a toaster wall 54 to the bracket 21. A support plate 54 is fixed in position relative to the toaster wall 54 and the respective shafts 23 extend through the support plate 54 and are rotatable within the support plate 54. The support plate 54 includes a guide rail 58 upon which the carriages 48 are slidably mounted. In the embodiment depicted, the guide rail 58 is horizontal (and exemplarily perpendicular to the platen). Therefore, movement of the carriage 48 exemplarily moves the bracket 21 (and the conveyor belt 30) towards and away from the platen 26. The carriage 48 further includes a rack 60 arranged with a plurality of rack teeth 62.

The shaft 23 is secured to a scallop plate 64. The scallop plate 64 includes a plurality of detents 66, which will be described in further detail herein. The scallop plate 64 also includes a pinion 68 that includes a plurality of pinion teeth 70. The pinion teeth 70 mesh with the rack teeth 62, such that rotation of the dial 22 rotates the shaft 23 and also translates the carriage 48 along the guide rail 58, in turn moving the bracket 21 and the rest of the conveyor assembly 24. In this manner, the relative position between the conveyor belt 30 and the platen 26 can be adjusted to adjust the toasting gap.

Position pins 72 resiliently engage the scallop plates 64 in the detents 66. The position pins 72 are secured to arms 74 which pivot about pivot points 76. Spring 78 biases the arms 74 and position pins 72 into engagement with the scallop plates 64. Although not depicted in FIG. 4, it will be recognized that springs 78 are connected to both arms 74. The resilient engagement of the position pins 72 in the detents 66 of the scallop plates 64, fixes the position of the scallop plate 64 (and by association, the carriage 48, bracket 21, and conveyor assembly 24) to a predefined position. In this manner, the dial 22 may be rotated to select between a plurality of predefined positions for the gap between the conveyor 30 and the platen 26. Visual indications 82 of these predefined positions are exemplarily shown in FIG. 1 relative to the dials 22. A stop block 80 is exemplarily secured to the support plate 56 about the guide rail 58. Engagement of the carriage 48 with the stop block 80 defines a minimum gap between the conveyor 30 and the platen 26. An inspection of FIGS. 1 and 4 shows that in an exemplary embodiment, the stop block 80 may be offset such that a minimum gap for one side of the toaster is greater than that of the other side. In an exemplary embodiment this may be used in a toaster 10 configured and used for toasting bun crowns and/or heels with one side and bun heels and/or club portions with the other. Typically, bun crowns are thicker than club portions or heels.

To accommodate movement of the conveyor assembly 24, the drive shaft 36 is also movable within the toaster 10. A translation plate 84 is movably connected to the drive shaft 35 in a manner such that the translation plate 84 pivots with translation of the drive shaft 36. A take-up wheel 86 is movably connected to the translation plate 84 and engages the drive chain 40. A tensioning spring 88 is connected to the take-up wheel 86 and biases the take-up wheel 86 to a position that keeps tension on the drive chain 40 at any position of the drive shaft 36.

Figure 5:
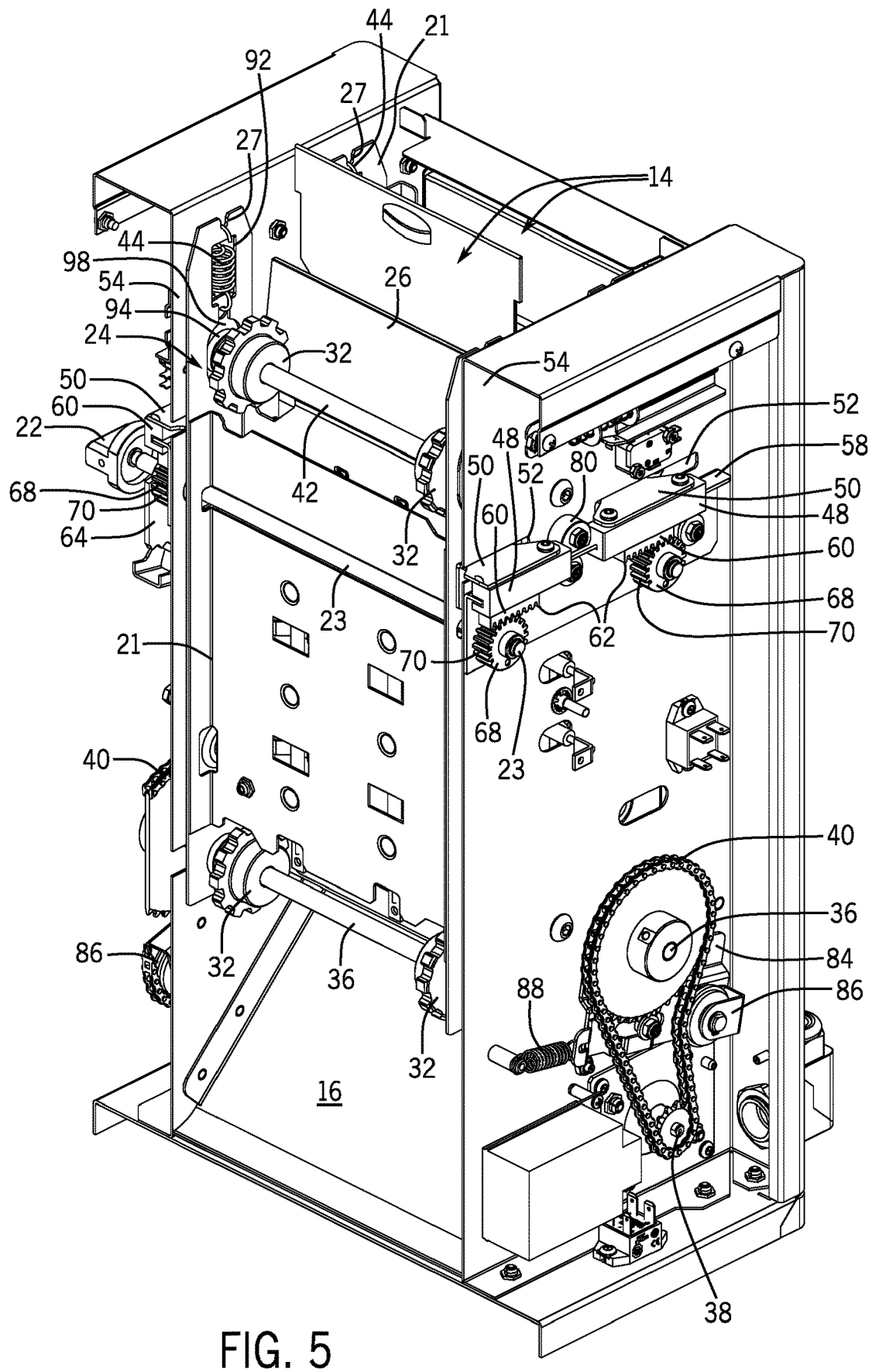
FIG. 5 is a sectional view taken along line 5-5 of FIG. 1.

FIG. 5 is a sectional perspective view of a toaster 10 as taken along line 5-5 of FIG. 1, and with the control side panel 15 and the off side panel 19 removed to reveal additional detail. Furthermore, the conveyor belt 30 is removed to better show the bracket 21 of the conveyor assembly 24. FIG. 5 further shows the off side of the toaster 10, exemplarily behind the off side panel 19 (removed in FIG. 5). The adjustment assemblies 46 correspond to those on the control side of the toaster 10 (as better shown in FIG. 4) and include similar components. As is better shown in FIG. 5, the bracket mounts 50 extend through the slots 52 in the toaster walls 54 and are secured to the respective brackets 21 of the conveyor assemblies 24. Similar adjustment assemblies 46 at either side of the toaster 10 help to keep the bracket 21 square to the platen 26 as the toaster gap is adjusted.

Figure 6:
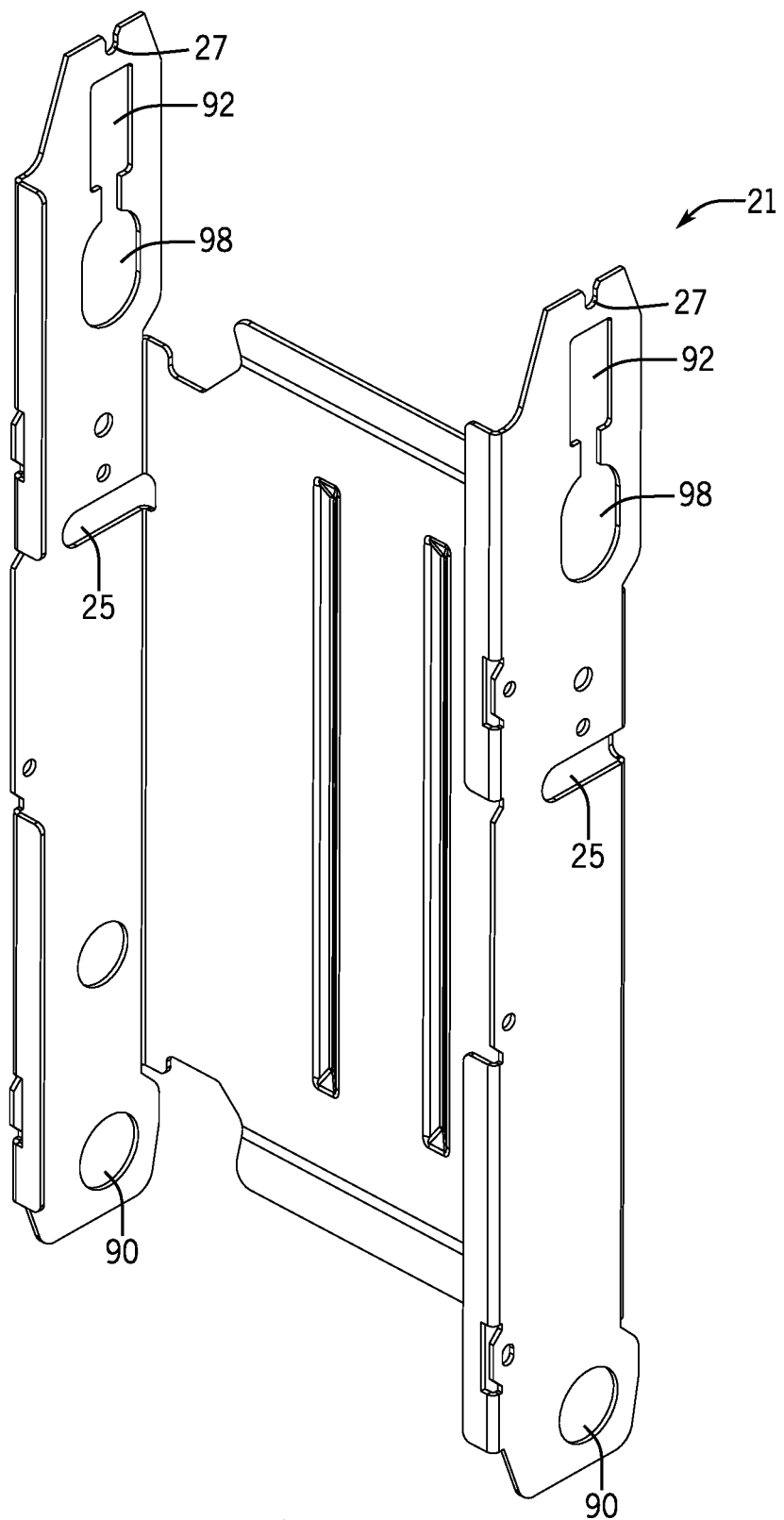
FIG. 6 depicts an exemplary embodiment of a bracket of a conveyor assembly.

As previously described, various components of the conveyor assembly 24 are connected to the bracket 21. The drive shafts 36 and the drive gears 32 are movably connected to the bracket 21 through drive holes 90. FIG. 6 is a perspective view of the bracket 21, depicting components thereof. The tension spring 44 hangs from a spring mount 27 and extends through a spring aperture 92 before connecting to a spring plate 94 connected to the slave gear 34 and/or the slave shaft 42. The slave shaft 42 connects the slave gears 34 to coordinate combined rotation of both of the slave gears 34. The slave gear 34, shaft 42, and/or spring plate 94 extend through an adjustment aperture 98. The adjustment aperture is dimensioned such as to accommodate a variety of vertical positions of the slave gears 34 and shaft 42. In exemplary and non-limiting embodiments, the adjustment aperture 98 may be a rectangle, ellipse, or an oval. In still further non-limiting exemplary embodiments, the adjustment aperture 98 may have a major axis dimension and a minor axis dimension. In this manner, the spring 44 may extend or retract based upon the tension in the conveyor belt of the conveyor assembly 24. In further exemplary embodiments, the spring mount 27 may be movable or adjustable such that the tension in the conveyor belt can be adjusted. In still further embodiments, the specific position of the slave gear 34 and slave shaft 42 may be adjustable, for example within the adjustment aperture 98 to select a conveyor belt tension.

Figure 7:
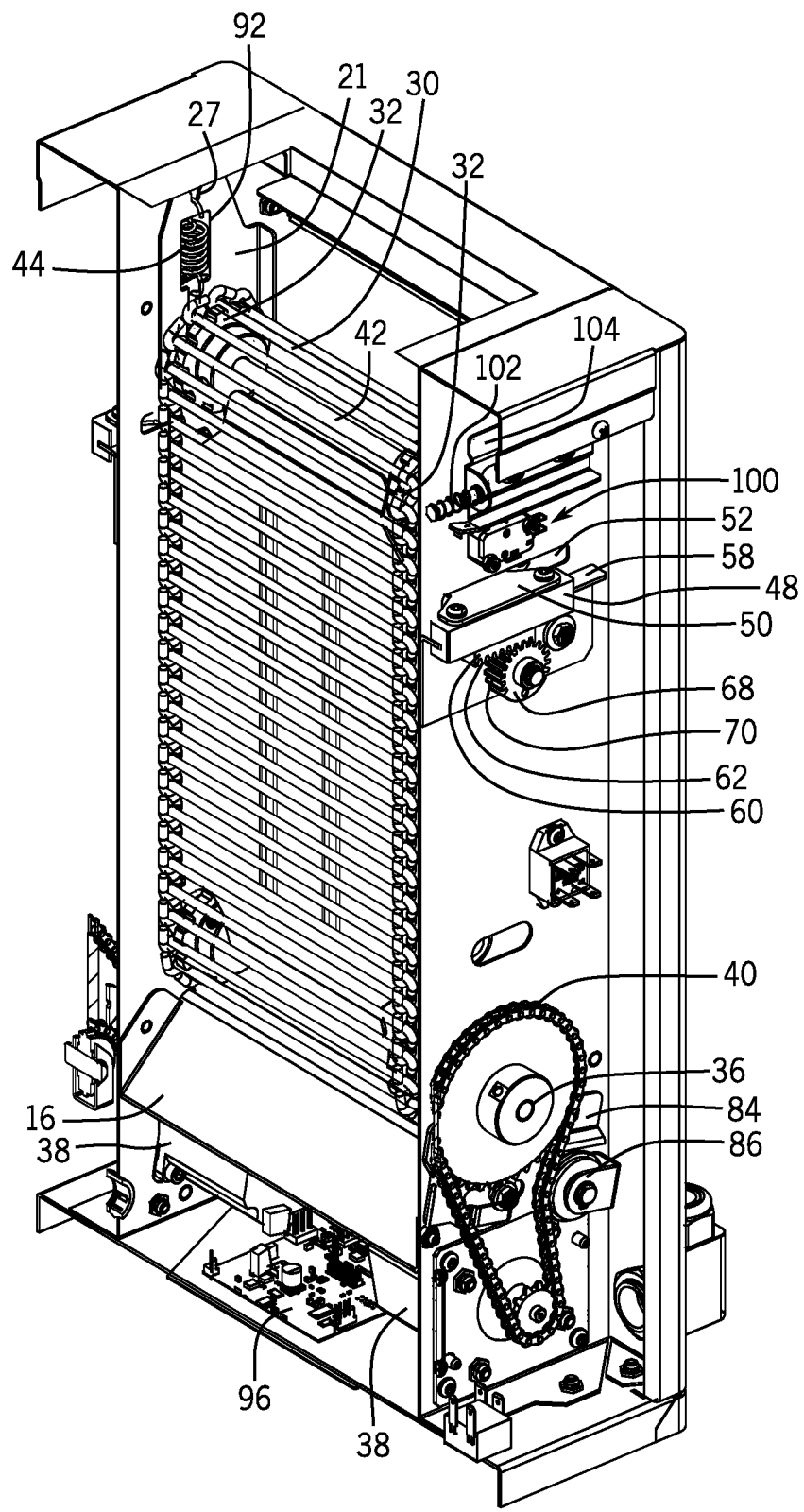
FIG. 7 is a sectional view taken along line 7-7 of FIG. 1.

FIG. 7 is a perspective view of the toaster 10 similar to FIG. 5 although taken along line 7-7 of FIG. 1. FIG. 7 better depicts a conveyor assembly 24 with the conveyor belt 30 as oriented in the toaster 10. FIG. 7 further depicts bracket mount 50 of the adjustment assembly 46 extending through the slot 52 in the toaster wall 54 to connect to the bracket 21.

Additionally, in the cut-away, the drive motors 38 and the processor 96 are depicted below the discharge slide 16. It will be recognized that the processor 96 may be implemented in the form of a controller, computer, or CPU as recognized by a person of ordinary skill in the art while remaining within the scope of the present invention.

As shown in FIGS. 4 and 7, the toaster 10 includes a shut-off relay 100 that is configured to disable operation or cut off power to some or all of the toaster 10, and particularly to at least one of the drive motors 38 and optionally to the other drive motor 38 and the heating coil 28, when one of the front panel 13 and the rear panel 17 is disconnected from the toaster 10. In an exemplary embodiment, one shut-off relay 100 is provided on the control side and associated with the front panel 13 and another shut-off relay 100 is provided on the off-side and associated with the rear panel 17. Because front panel 13 and the rear panel 17 provide a safety function of limiting access to the moving and hot components interior the toaster 10, the shut-off relays 100 provide an additional safety measure. The shut-off relay 100 includes a bias spring 102 that forces an engagement plunger 104 into a position wherein the engagement plunger 104 is pushed inwards by the front panel 13 or the rear panel 17 connected to the toaster 10. The engagement plunger 104, thus engaged, trips switch 106 completing an associated power circuit powering an associated portion of the toaster 10.

FIGS. 8 and 9 diagrammatically depict exemplary embodiments of conveyor assemblies 24 in accordance with exemplary embodiments of the present disclosure. FIG. 8 depicts a signal conveyor system, for example to toast a food product 108, for example a crown of a bun, by dragging the bun across a heated platen 26. The tension spring 44 controls a position of the slave gear 34 which in turn controls the tension on the conveyor belt 30 such that the flexible conveyor belt 30 deforms around the bun crown 108 to impart the dragging force against the bun crown 108 without crushing the bun crown 108 or minimizing crushing of the bun crown 108. In an exemplary embodiment, the tension imparted by the tension spring 44 may be adjustable to provide a desired amount of crushing force against the food product.

FIG. 9 depicts a two conveyor system with heated platens 26 located interior to the conveyor assemblies 24 in such embodiments, the conveyor belts 30 are thermally conductive and the toasting treatment is provided to the food product 108 on both sides. In non-limiting embodiments, the food product 108 may be a piece of Texas toast, a club portion of a bun or a burrito. The tension of the conveyor belts 30 are controlled by the tension spring 44 such that the conveyor belt 30 deforms around the food product 108 and drags the food product 108 along the platen 26 to toast the food product 108.

FIG. 10 is a schematic depiction of an exemplary embodiment of a toasting system in accordance with exemplary embodiments as described in further detail herein. In the exemplary embodiment depicted in FIG. 10, positions of various components are independently adjustable. In the exemplary embodiment of FIG. 10, a rack and pinion may be used for moving the relative positions of components. One embodiment of a rack and pinion implementation is described above with respect to FIGS. 1-7. It will be recognized that in alternative embodiments a variety of other known conveyance apparatus may be used, including, but not limited to linear actuators, worm drives, or others. While the embodiment described above with respect to FIGS. 1-7 provide for an adjustable spacing between the platen 26 and the conveyor belt 30, additional embodiments and adjustable features are disclosed herein and a person of ordinary skill in the art would recognize that the features disclosed herein may be combined with other features disclosed herein to form still further embodiments within the scope of the present disclosure.

In an example, top and bottom ends of the platen are independently moveable. In an embodiment this may be used to adjust a toaster gap, nominally indicated as D. In another embodiment, the top and bottom of the platen may be movable in combination with similar adjustment of the conveyor assembly 24 to adjust the toaster gap D. It will be recognized that the thickness of the food product must be greater than the distance D for the food product to be held within the toaster to be toasted. However, because the ends of the platen 26 are independently moveable, in an exemplary embodiment, one or both of the ends of the platen may be moved towards or away from the conveyor assembly 24 either before a product is received to be toasted or while a product is being toasted. In an exemplary embodiment, the top of the platen 26 may be moved away from the conveyor assembly such as to facilitate receiving a food product into the toaster. Once the food product is received within the toaster, the top end or both ends of the platen are moved towards the conveyor assembly 24 to exemplarily achieve the desired crush force on the food product.

The conveyor assembly 24 may similarly be independently moved at its top end and bottom end towards or away from the platen 26 also to adjust the distance D and/or the crush force against the food product as it is being toasted.

Referring generally to FIG. 4, in a further exemplary embodiment, an additional set of adjustment assemblies 46 depicted and described above, may be provided to independently move the lower ends of the conveyor assemblies 24. A shaft 23 of the lower adjustment assemblies (not depicted) exemplarily would extend through the respective bracket 21 and conveyor assembly 24 through a lower slot in the bracket 21. The bracket mounts for both the adjustment assembly 46 and additional lower adjustment assembly would be pivotably connected to the bracket 21 such that the adjustment assemblies can be operated to position the upper end of the conveyor assembly at a different position relative to the platen than the lower end of the conveyor assembly. In a still further embodiment, the support plate 56 may be two separate plates or structures, rather than being a single plate connected to both of the adjustment assemblies 46 as shown in FIG. 4. While not depicted, the separate support plate may be rotatable such as to rotate the entire adjustment assembly 46. The adjustment assembly 46 may be rotatable by gears, screws, or other rotation solutions as would be recognized by a person of ordinary skill in the art. In one embodiment, a system similar to the scallop plate 66 and pinion 68 may be used to rotate the adjustment assembly 46. By rotating the adjustment assembly clockwise or counter-clockwise, the conveyor assembly 24 would orient at an angle relative to the platen 26.

Referring back to FIG. 10, in another exemplary embodiment one or both of the bottom ends of the platen and/or conveyor assembly 24 may be moved away from each other at a predetermined completion of a toasting process such as to release the food product from the toaster to the discharge port. In a still further exemplary embodiment, the mounting head 110 of the tension spring 44 may be adjustable to further control the tension placed on the conveyor belt 30. As previously noted, in a still further embodiment, the slave gear 34, or another portion of the conveyor assembly 24 is movably connected to an actuator, for example a linear actuator or a mechanized rack and pinion, such that a component of the conveyor assembly 24 is positionable relative to other components of the toaster, or positionable relative to other components of the conveyor assembly 24. In such an embodiment, the tension could be set directly, rather than relying upon the mechanical properties of the springs to place a tensioning force on the conveyor 30. In a still further embodiment, the springs may still be connected to the slave gear 34, but the connection point (e.g. spring mounts 27) are movable towards and away from the drive gear 32, for example with the linear actuator to increase or decrease the tension on the conveyor belt 30, such tension being damped by the spring. In another embodiment an eccentric, ellipsoid, or other arranged cam may be operated to adjust the tension on the conveyor belt. The cam can either operate to move the spring mount or connection point between the bracket and the slave gear or can place a tensioning force on the conveyor belt itself.

While the above description of the adjustable conveyor toaster 10 relative to FIGS. 1-10 has generally used a manual adjustment embodiment for exemplary purposes, other embodiments may be implemented in an automated manner. Electrical stepper or servo motors, or other drive mechanisms may be used to make the above described adjustments to the conveyor assembly position and tension. In embodiments, such electro-mechanical adjustments of the toaster would be carried out through inputs to and outputs from the processor 96.

Figure 11:
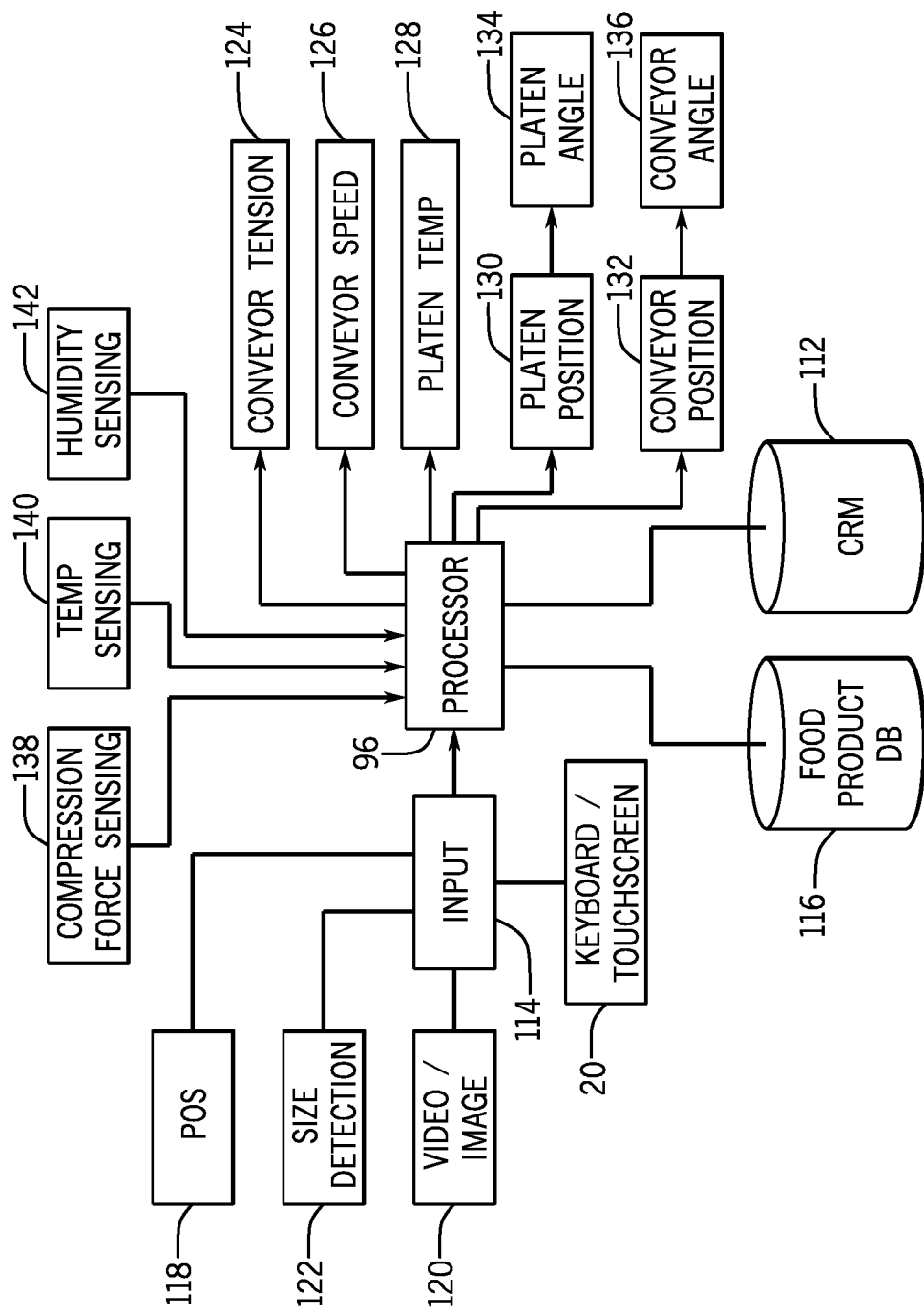
FIG. 11 is a system diagram of an adjustable toaster.

FIG. 11 is a system diagram that depicts exemplary functions and operations of an embodiment of a toaster 10. In the exemplary embodiment, the functions and operations of the toaster 10 are controlled and carried out by a processor 96 as used herein, the term processor means any of a variety of known controllers or microcontrollers integrated circuits and/or printed circuit boards comprising electronics to read and execute computer readable code to produce instructions and control commands as described in further detail herein.

The processor 96 is communicatively connected to a computer readable media 112 which stores computer readable code that is executable by the processor to carry out the functions and operations as described in further detail herein.

The processor 96 is further connected to one or more input devices 114 which are used to exemplarily input a type of food product to be toasted and/or to input specific controls or instructions for future toasting of food products. A keyboard/touchscreen interface, for example as depicted in FIG. 1 as part of a display 20, exemplarily a touch-sensitive display 20, may be used to select a variety of food products the dimensions, qualities, and toasting requirements of which are stored in a food product database 116.

The user interface on the touch-sensitive display 20 exemplarily is configured to receive user control inputs for conveyor belt speed and platen temperature. These may be available to the user through prompts or menu navigation, or other input schema. Furthermore, the user interface may present and enable user selection of a variety of preset toasting configurations. In embodiments, these may be common setting combinations of temperature and speed. For example, a high output mode may use a high temperature and conveyor speed, while an efficiency mode may use a lower temperature and speed. Based upon a kitchen's use patters, these may be characterized into a "breakfast", "lunch", and "late-night" settings. In a still further exemplary embodiment, the preset configurations may identify particular bread types (e.g. bun, bagel, English muffin, toast). Each of these bread types may have a particular combination of one or more of: toaster gap, belt tension, conveyor speed, and platen temperature for desired toasting of that particular baked product. In an embodiment, these setting combinations may be stored in the food product database 116. Once a preset operation configuration is selected, the toaster 10 may operate according to the selected stored combination of settings and may further operate the display 20 (or another display) to provide a visual indication of the currently selected preset operation. In still further embodiments, the user may control the operation of other functions of the toaster 10, for example a temperature of a heated landing zone in the area of the discharge port 18 (FIG. 1) or a platen temperature for a back side heater within the toaster.

The input device 114 may further be a communicative connection to a point of sale (POS) system 118 of the kitchen. The POS system 118 may be local to the kitchen or may be a networked or cloud-computing based information system that receives and manages customer orders. The POS system 118 may include a register, kiosk, or computer or mobile ordering interface whereby a customer order is received. The POS system 118 may further track and coordinate the preparation and assembly of items in the order. In an exemplary embodiment, this may include providing instructions to the toaster regarding the type of toasted baked good and/or toaster settings for the order. In another embodiment, the POS system 118 may provide a queue of toasting operations from which the toaster can adjust to the required settings for each operation in the queue.

In still further exemplary embodiments, video and/or image capturing 120, for example, associated with the feed opening can be used, in conjunction with image processing techniques and apparatus to identify the food product being inserted into the feed opening 14. Once the food product has been identified, the appropriate toaster setting and/or toasting profile from the food product database 116 may be accessed by the processor 96. In a still further exemplary embodiment, size detection 122 is used to identify or gather additional information regarding the bread product to be toasted. As used herein size detection may be a detection of any physical property of the bread product, which may include a dimension, shape, volume, weight, density, or other property as may be recognized in view of this disclosure. For example, optical (e.g. lasers or infrared) or ultrasound or other dimension detection techniques in association with the opening 14 may be used to identify dimensions, volume, and/or shape of the food product. In some embodiments, measurement of one or more of these, may be indicative of the food product itself, particularly when food products to select from are varied in these parameters or when a food product has a particular known size and/or shape. In still further embodiments, the weight and/or density of the food product may be identified in addition to the dimension detection described above, this can be a further distinguishing characteristic between otherwise similarly dimensioned food products. This may exemplarily be done with the use of a load cell arranged in relation to the opening 14.

The processor 96, having received an identification of the food product to be toasted, accesses the food product database 116 to retrieve information regarding the food product, and particularly a toasting profile for the food product. The toasting profile may include a variety of adjustments made to the toaster system to achieve a predetermined standard of toasting for the food product. As previously described, embodiments of the toaster include multiple systems which are independently adjustable in order to accommodate a wide variety of food products and toasting requirements of such food products. Therefore, according to the toasting profile, the processor may adjust the conveyor tension at 124, for example by adjusting the position of the mounting head 110 of the tension spring 44, the processor 96 may adjust the conveyor speed 126, for example by operating one or more of the drive motors 38 to a predetermined speed. In an exemplary embodiment, a system that includes two or more parallel toasting systems, for example as depicted in FIGS. 2 and 3, the drive motors 38 may be operated at different speeds so as to toast two related food products simultaneously or to toast two food products with different toasting requirements in the same amount of time.

The processor 96 may control or operate the platen temperature 128. This may be performed by operating the heating coil 28 internal to the heated platens.

As described above, the processor 96 may further adjust the platen position 130 and/or the conveyor position 132 such as to control the toaster gap distance D. This may be exemplarily performed by moving the top and/or bottoms of the platen and/or the conveyor assembly for example by rack and pinion or linear actuator. As a result of the platen and the conveyor being individually positionable at both the top and bottom of these respective devices, adjustment of the platen position 130 and the conveyor position 132 can further result in adjustment of the platen angle 134 and the conveyor angle 136 for example by moving the top and/or bottom of the platen and/or conveyor to a position different from the respective other end.

It is further recognized that these adjustments may also be made intra-toasting such as to create further toasting effects or to achieve a predetermined toasting amount or color. For example, while the identified food product is being toasted, the processor 96 may adjust the conveyor tension 124 to increase or reduce the crushing force against the food product, forcing the food product against the platen in order to change the toasting effect achieved.

Additionally, the processor 96 may further receive feedback from one or more sensors located within the toaster to provide information regarding the actual toasting conditions achieved within the toaster. This feedback may be used by the processor to adjust the operation of the toaster in a manner so as to achieve the predetermined toasting qualities. The processor 96 may receive data indicative of compression force sensing 138 temperature sensing 140, and humidity sensing 142. Such sensors may be respectively located internal to the toaster in a manner so as to gather the associated information. For example, temperature sensing and/or humidity sensing may be used for example to identify if a food product was frozen, or dry, or more moist than normally expected and the processor 96 may adjust the operation of the toaster to remediate these conditions of the food product during operation of the toaster.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A conveyor toaster comprising:
   a cabinet defining the exterior of the conveyor toaster, the cabinet comprising a feed opening therethrough;
   a conveyor assembly arranged inside the cabinet relative to the feed opening, the conveyor assembly comprising a first gear and a second gear with a conveyor belt in engagement with the first gear and the second gear;
   a drive motor operably connected to the first gear, wherein the drive motor operates the first gear to move the conveyor belt about the first and second gears;
   a platen arranged inside the cabinet relative to the feed opening, the platen positioned relative to the conveyor belt and configured to be heated;
   a sensor arranged relative to the feed opening to detect a food product entering the cabinet through the feed opening; and
   a processor operably connected to the sensor, the drive motor, and the platen, and the processor is configured, in response to the sensor, to control a speed of the conveyor belt driven about the first gear and the second gear and to control a temperature of the platen.

2. The conveyor toaster of claim 1, wherein the processor is configured to receive an identification of the food product from a point of sale system, configured to access toaster settings based upon the identification, and configured to operate the conveyor toaster to adjust at least one of a tension of the conveyor, a position of the conveyor or a position of the platen according to the toaster settings.

3. The conveyor toaster of claim 1, wherein the processor operates the drive motor to control the speed of the conveyor belt based upon the detection of a food product entering the cabinet through the feed opening.

4. The conveyor toaster of claim 3, wherein the sensor is an optical sensor.

5. The conveyor toaster of claim 4, wherein the optical sensor comprises a laser or infrared light.

6. The conveyor toaster of claim 5, wherein the processor identifies the food product based upon signals from the optical sensor and operates the conveyor toaster to adjust at least one of a tension of the conveyor or a gap between the conveyor and the platen, based upon a preset operation configuration associated with the identified food product.

7. The conveyor toaster of claim 4, wherein the processor determines a size of the food product based upon signals from the optical sensor.

8. The conveyor toaster of claim 7, wherein the processor operates the conveyor toaster to adjust at least one of a tension of the conveyor or a gap between the conveyor and the platen in response to the size of the food product as determined by the processor.

9. The conveyor toaster of claim 3, wherein the sensor comprises ultrasound.

10. The conveyor toaster of claim 3, wherein the processor operates the conveyor toaster with a first platen temperature and a first conveyor speed and in response to the sensor, the processor operates the conveyor toaster to a second platen temperature higher than the first platen temperature and the processor operates the conveyor toaster to a second conveyor speed higher than the first conveyor speed.

11. The conveyor toaster of claim 3, wherein the sensor comprises a digital camera.

12. The conveyor toaster of claim 11, wherein the processor operates to receive at least one image from the digital camera, the processor applies image processing to the at least one image and identifies a food item positioned relative to the digital camera, and the processor operates the conveyor toaster to adjust at least one of a tension of the conveyor or a gap between the conveyor and the platen.

13. The conveyor toaster of claim 3, further comprising a temperature sensor positioned within the cabinet and communicatively connected to the processor wherein based upon a signal from the temperature sensor, the processor operates at least one of the drive motor to adjust the speed of the conveyor or the platen to adjust the platen temperature.

14. The conveyor toaster of claim 3, further comprising a humidity sensor positioned within the cabinet and communicatively connected to the processor wherein based upon a signal from the humidity sensor, the processor operates at least one of the drive motor to adjust the speed of the conveyor or the platen to adjust the platen temperature.

15. The conveyor toaster of claim 1, wherein the sensor is an optical sensor, the processor is configured to receive signals from the optical sensor, determine a size of the food product based upon the signals from the optical sensor, and operate the conveyor toaster to adjust at least one of a tension of the conveyor, a position of the conveyor or a position of the platen according to the toaster settings.

16. A method of toasting a food product with the conveyor toaster of claim 1, the method comprising:
    detecting a food product at the feed opening with the sensor; and
    increasing the speed of the conveyor upon detection of the food product.

17. The method of claim 16, further comprising operating the conveyor toaster in an efficiency mode with the conveyor operated at a low speed.

18. The method of claim 17, further comprising operating the conveyor toaster in a high output mode with a high platen temperature and a high conveyor speed.

19. The method of claim 16, wherein the efficiency mode further includes operating the conveyor toaster with a low platen temperature.

20. The method of claim 16, further comprising operating the conveyor toaster in a high output mode with a high platen temperature and a high conveyor speed.

* * * * *